United States Patent
Miyagawa et al.

(10) Patent No.: US 8,648,510 B2
(45) Date of Patent: Feb. 11, 2014

(54) ACTUATOR COVER STRUCTURE, ACTUATOR, AND POWER TRANSMITTING APPARATUS

(75) Inventors: Takeshi Miyagawa, Toyokawa (JP); Takanao Sugiura, Okazaki (JP); Mamoru Moriyama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 297 days.

(21) Appl. No.: 12/666,319

(22) PCT Filed: Oct. 7, 2008

(86) PCT No.: PCT/IB2008/003260
§ 371 (c)(1),
(2), (4) Date: Dec. 23, 2009

(87) PCT Pub. No.: WO2009/047636
PCT Pub. Date: Apr. 16, 2009

(65) Prior Publication Data
US 2010/0186531 A1    Jul. 29, 2010

(30) Foreign Application Priority Data
Oct. 9, 2007 (JP) .................................. 2007-263468

(51) Int. Cl.
H02K 5/04    (2006.01)
(52) U.S. Cl.
USPC .......................................... 310/89; 74/473.23
(58) Field of Classification Search
USPC .................................... 74/473.23; 310/85, 89
See application file for complete search history.

(56) References Cited

U.S. PATENT DOCUMENTS 2,424,253 A * 7/1947 Pierce .............................. 55/373
2,728,370 A * 12/1955 Neuschotz .................... 411/103
(Continued)

FOREIGN PATENT DOCUMENTS

DE    103 15 871 A1    10/2004
JP    62-082457 U    5/1987
(Continued)

OTHER PUBLICATIONS

Japanese Office Action issued Oct. 27, 2009 for counterpart Japanese Application No. 2007-263468.

(Continued)

Primary Examiner — David M Fenstermacher
Assistant Examiner — Terence Boes
(74) Attorney, Agent, or Firm — Sughrue Mion, PLLC

(57) ABSTRACT

A cover structure of an actuator is provided in which a case of the actuator, which houses a conversion mechanism that converts input energy to mechanical motion, has a metal cover fastening portion and a cover member to which a metal fastening part that is fastened to the cover fastening portion is integrally attached. The cover member is formed by a metal cover portion and a resin cover portion. The metal cover portion has a center portion that covers part of the conversion mechanism, and an extended portion that extends from the center portion to the area near the metal fastening part so as to oppose the cover fastening portion. In this way, a vehicular power transmitting apparatus that discourages theft is provided by realizing an actuator with a strong cover fastening structure by making the fastening portion of the actuator be able to withstand intentionally inflicted damage without its weight being increased much.

9 Claims, 4 Drawing Sheets

(56) References Cited

U.S. PATENT DOCUMENTS

| | | |
|---|---|---|
| 2005/0155444 A1 | 7/2005 | Otaki et al. |
| 2006/0232393 A1 | 10/2006 | Kimura et al. |
| 2007/0062841 A1 * | 3/2007 | Nakamura et al. ............ 206/562 |

FOREIGN PATENT DOCUMENTS

| | | |
|---|---|---|
| JP | 03-020155 A | 1/1991 |
| JP | 2004-034788 A | 2/2004 |
| JP | 3692791 B2 | 7/2005 |
| JP | 2005-231564 A | 9/2005 |
| WO | 00/48293 A1 | 8/2000 |

OTHER PUBLICATIONS

Japanese Office Action issued Sep. 7, 2010 for counterpart Japanese Application No. 2007-263468.

* cited by examiner

ACTUATOR COVER STRUCTURE, ACTUATOR, AND POWER TRANSMITTING APPARATUS

The disclosure of Japanese Patent Application No. 2007-263468 filed on Oct. 9, 2007, including the specification, drawings and abstract is incorporated herein by reference in its entirety.

BACKGROUND OF THE INVENTION

1. Field of the Invention

The invention relates to an actuator and an actuator cover structure attached to the outside of a vehicular power transmitting apparatus, and that power transmitting apparatus.

2. Description of the Related Art

A vehicular automatic transmission or a power transmitting apparatus for a hybrid vehicle that has both an internal combustion engine and an electric motor as prime movers, is known which increases the degree of freedom in the arrangement and operating method of a shift operating portion by replacing mechanically operated linkage with an electrically operated system using so-called shift-by-wire (hereinafter simply referred to as "SBW") control which electrically detects operation of a shift lever or a shift switch and controls range shifting means with an actuator that can be electrically controlled. This kind of power transmitting apparatus includes a parking lock mechanism that mechanically locks any one rotating member in a power transmitting path from the prime mover to driving wheels when a shift lever is shifted into a parking range position.

Japanese Patent No. 3692791, for example, describes one such parking lock mechanism that includes, for example, a pivoting lock pawl that engages/disengages to/from any one rotating member in the power transmitting path from the prime mover to the driving wheels, a translation cam that makes the lock pawl pivot, an operating link that moves the translation cam backward or forward, and an SBW motor that turns the operating link.

However, in a power transmitting apparatus having a parking mechanism like that described above, part of the motor case of the SBW motor which is an actuator that is mounted to the outside of the transmission case is made of resin to reduce the weight. As a result, a flange portion in particular, which is used to fasten the resin cover to the main body of the motor case, is not strong enough to withstand intentional damage. As a result, the vehicle could conceivably be stolen by breaking the flange portion (i.e., cracking the resin of the fastening portion using a screwdriver and a hammer, for example), removing the resin cover, and turning the rotor of the SBW motor to unlock the parking lock mechanism so that the vehicle can be moved.

Although it is possible to make the entire resin cover portion of the motor case out of metal in order to prevent this type of theft, doing so would also greatly increase the weight of the actuator which would reduce fuel efficiency.

SUMMARY OF THE INVENTION

Thus, this invention provides an actuator that discourages theft by realizing an actuator cover structure having a strong fastening structure in which a portion that fastens an actuator such as an SBW motor to a supporting body is able to withstand intentional damage without increasing the weight of the actuator much. The invention also provides a power transmitting apparatus provided with that actuator.

A first aspect of the invention relates to an actuator cover structure in which a case of an actuator, which houses a conversion mechanism that converts input energy to mechanical motion, has a metal cover fastening portion and a cover member to which a metal fastening part that is fastened to the cover fastening portion is integrally attached. The cover member is formed by a metal cover portion and a resin cover portion. The metal cover portion has a center portion that covers part of the conversion mechanism, and an extended portion that extends from the center portion to the area near the metal fastening part so as to oppose the cover fastening portion.

According to this actuator cover structure, the fastening portion of the cover member that forms part of the actuator case has the extended portion of the metal cover portion and is thus able to withstand intentionally inflicted damage.

The actuator cover structure described above may also be such that the actuator is a motor which has a rotor and a stator that convert input electrical energy into rotation output, the center portion of the metal cover portion is formed in a circular shape which covers an end portion of the rotor and the stator on the side opposite the side where the rotation of the rotor is output, and the extended portion of the metal cover portion extends radially outward from the center portion. In this case, the extended portion of the metal cover portion may extend radially outward from the center portion in a plurality of locations.

In this case, because the metal cover portion of the actuator not only covers the end portion of the rotor and stator which form the conversion mechanism, but can also be used to support them, and because there is often already an existing metal cover portion, a cover structure can be realized which has a strong fastening structure without increasing the weight of the cover member much.

Also, in the actuator cover structure described above, the extended portion of the metal cover portion may have a surrounding portion that surrounds an outer periphery of the metal fastening part.

According to this structure, the area around the metal fastening part which is surrounded by the surrounding portion is reliably protected by the metal cover portion and is securely joined to the metal cover portion, which increases the strength of the fastening portion.

Also, in the actuator cover structure described above, the resin cover member may cover the outer surface of the metal cover portion and form the outer surface of the cover member.

In this case, the metal cover portion is covered by the resin cover portion so even if metal that can easily be molded at low cost or metal that is advantageous in view of the characteristics of the conversion mechanism is used for the metal cover portion, a corrosion resistant coating and the like can be omitted and the actuator is easier to handle. In addition, the metal cover portion is not easily detectable from the outside so it is unlikely that the cover member will be tampered with and damaged.

In the actuator cover structure described above, the metal fastening part may be formed by one screw member that is embedded in the resin cover portion of the cover member, and the metal cover fastening portion provided on the case side may be formed by another screw member that screws and fastens to the one screw member from a mounting surface side toward the outside of the actuator.

According to this structure, the cover fastening portion on the case side is screwed to the metal fastening part in the cover member from the mounting surface side toward the outside of the actuator so it is visibly clearly difficult to remove the cover member from the outside, which helps to discourage theft.

In the actuator cover structure described above, the metal cover portion and the resin cover portion may be integrally formed together.

This structure makes facilitates handling and makes it more difficult to intentionally break the cover member from the outside. Incidentally, the term "integrally formed" in this case refers to the metal cover portion and the resin cover portion being formed while integrally joined by insert-forming or the like.

Also, in the actuator cover structure described above, the metal cover portion may be a member that supports an internal object that is housed inside the actuator.

According to this structure, the metal cover portion is a part that supports an internal object such as the conversion mechanism which is housed inside the actuator, so the structure described above can be obtained by extending a portion of an existing part.

Further, in the actuator cover structure described above, the internal object may be the rotor of the actuator.

In this case, the metal cover portion of the actuator is also used to support the rotor so by extending a portion of an existing metal cover portion, a cover structure having a strong fastening structure can be realized without increasing the weight of the cover member much.

Meanwhile, a second aspect of the invention relates to an actuator provided with a conversion mechanism that converts input energy to mechanical motion and a case that houses the conversion mechanism, in which the case has a cylindrical case main body, one end of which is closed, to which a metal cover fastening portion is attached, and a cover member to which a metal fastening part that is fastened to the cover fastening portion is integrally attached. The cover member is formed by a metal cover portion and a resin cover portion. The metal cover portion has a center portion that covers part of the conversion mechanism, and an extended portion that extends from the center portion to the area near the metal fastening part so as to oppose the cover fastening portion.

According to this actuator, the fastening portion of the cover member that forms part of the actuator case has the extended portion of the metal cover portion so it can withstand intentionally inflicted damage.

In this case, the case main body may have a metal bracket portion that forms a mounting surface toward the outside, a metal case portion that covers one end side of the conversion mechanism from which the mechanical motion is output, and a resin case portion that covers the metal case portion between the metal bracket portion and the metal case portion.

According to this structure, the conversion mechanism of the actuator is covered by the resin cover while being entirely surrounded by the metal case portion and the metal cover portion so even if metal that can easily be molded at low cost or metal that is advantageous in view of the characteristics of the conversion mechanism is used for the metal case portion or the metal cover portion, a corrosion resistant coating and the like can be omitted and the actuator is easier to handle.

Further, a third aspect of the invention relates to a shift-by-wire power transmitting apparatus which has a plurality of rotating members in a power transmitting path that transmits power from a prime mover of a vehicle to a driving wheel side, and which operates according to a shift operation. This power transmitting apparatus includes a case to which the actuator is externally mounted, and a parking lock mechanism which is operated by the actuator and mechanically locks one of the rotating members in the power transmitting path when a parking range position is selected by the shift operation.

According to this power transmitting apparatus, the extended portion of the metal cover portion enables the fastening portion of the cover member which forms part of the actuator case to withstand intentional damage. As a result, this power transmitting apparatus discourages theft that may result from breaking the fastening portion of the cover member to unlock the parking lock mechanism.

According to the invention, the fastening portion of the cover member that forms part of the actuator case is formed by an extended portion of the metal cover portion. As a result, a cover structure that can withstand intentional damage and an actuator having this cover structure are able to be provided. Also according to the invention, a power transmitting apparatus can be provided which discourages theft that may result from breaking the fastening portion of the cover member to unlock a parking lock mechanism of a vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE PREFERRED EMBODIMENTS

Example embodiments of the present invention will be described in greater detail below with reference to the accompanying drawings.

Figure 1:
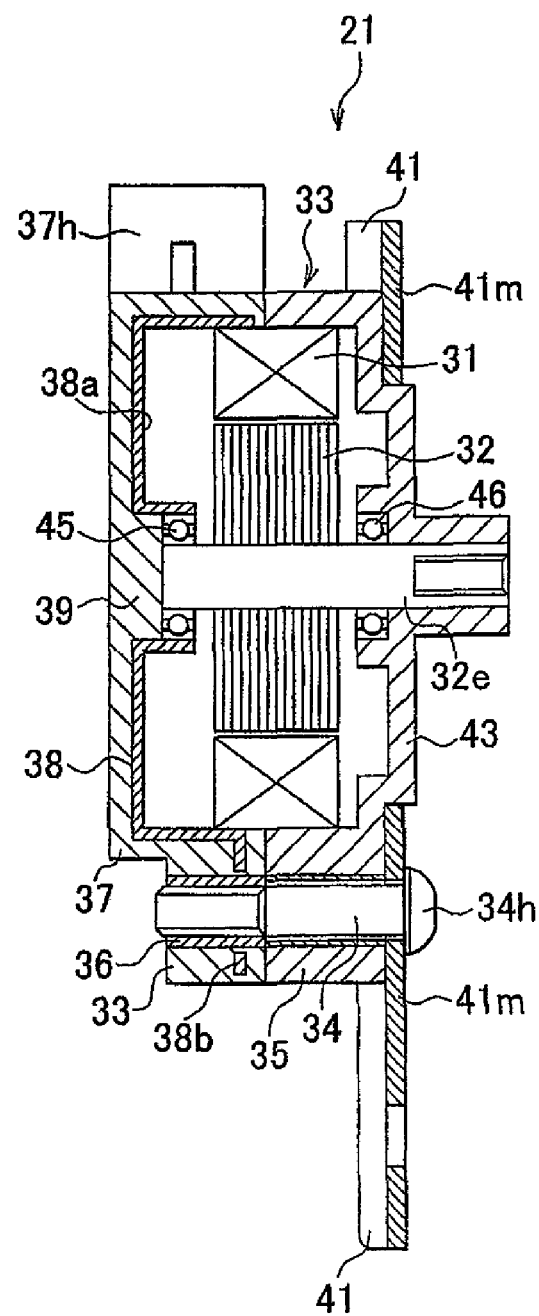
FIG. 1 is a longitudinal sectional view of an actuator according to one example embodiment of the invention.
Figure 2:
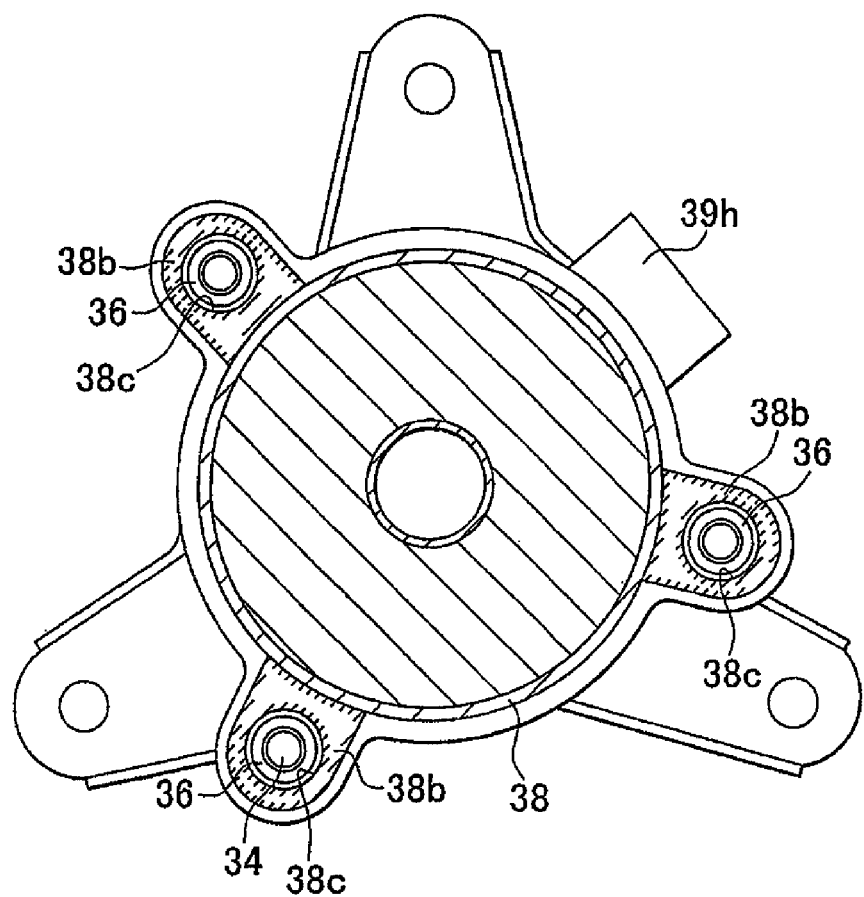
FIG. 2 is a sectional view of the main portions on the back side where only a metal cover portion of a cover member overlaps with a case main body of the actuator according to the example embodiment of the invention.
Figure 3:
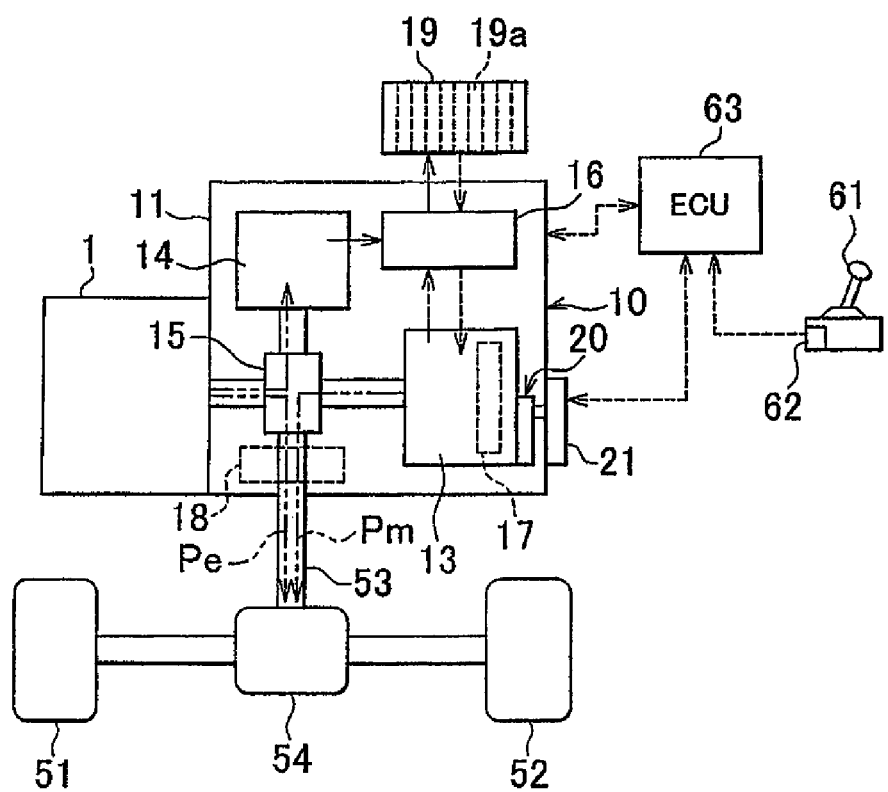
FIG. 3 is a block diagram schematically showing a hybrid power unit and an SBW system of a vehicle provided with a power transmitting apparatus according to the example embodiment of the invention.
Figure 4:
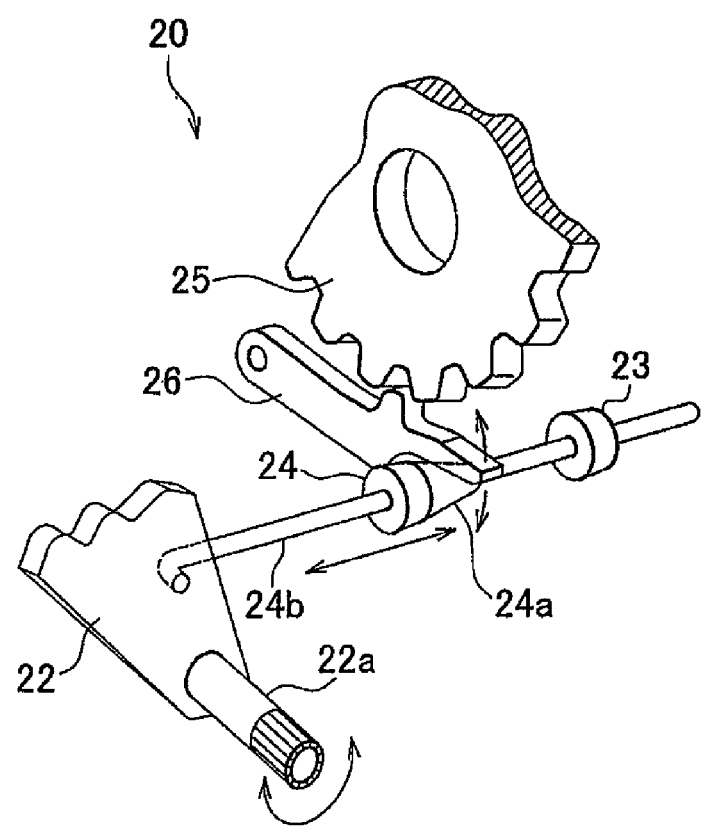
FIG. 4 is a perspective view showing the general structure of the main portions of a parking lock mechanism of the power transmitting apparatus according to the example embodiment of the invention.

FIGS. 1 to 4 are views of a vehicular power transmitting apparatus and an actuator according to one example embodiment of the invention. FIG. 1 is a longitudinal sectional view of the actuator. FIG. 2 is a sectional view of the main portions on the back side where only a metal cover portion of a cover member overlaps with a case main body of the actuator. FIG. 3 is a block diagram schematically showing a hybrid power unit and an SBW system of the vehicle, and FIG. 4 is a perspective view showing the general structure of the main portions of a parking lock mechanism of the power transmitting apparatus.

As shown in FIG. 3, the power transmitting apparatus 10 of this example embodiment is a hybrid transmission that has a transmission case 11 which is connected to an engine 1 which is the prime mover of the vehicle. This power transmitting apparatus 10 includes an AC synchronous electric motor 13, a generator 14, a power split device 15, and an inverter 16 all arranged inside the transmission case 11.

The electric motor 13 is a motor-generator that can be driven by a battery pack 19 onboard the vehicle, as well as used to charge the battery pack 19 during regenerative braking. The generator 14 generates electricity, which is used to charge the battery pack 19, when driven by power from the engine 1. The battery pack 19 includes a plurality of battery modules 19a, each of which is made up of a plurality of integrated cells, for example, and these battery modules 19a are connected together in series.

The power split device 15 is a well-known gear mechanism that can distribute/split power from the engine 1 between a power transmitting shaft 53 to driving wheels 51 and 52, and the generator 14, as well as function as a gear change mechanism. More specifically, although not shown, in the power transmitting apparatus 10 of this example embodiment, the power split device 15 that distributes power from the engine 1 is a planetary gear set that includes a sun gear, a plurality of pinions arranged around the sun gear, a carrier that rotatably and revolvably supports the pinions, and a ring gear that has internal teeth which mesh with the external teeth of the plurality of pinions. Power from the engine 1 is input to the carrier that supports the pinions, while power from the electric motor 13 is input to either the ring gear or the sun gear of the planetary gear set. When that power is input to the ring gear, for example, the rotation of the sun gear is output to the input shaft of the generator 14. Also, a rotation outputting element for transmitting power to the driving wheels 51 and 52 is integrally attached to the ring gear.

The inverter 16 is a well-known device which optimally controls the direct current of the battery pack 19 and the alternating current for driving the electric motor 13 and the generator 14.

The power transmitting apparatus 10 includes a well-known power transmitting mechanism that forms a power transmitting path (shown by arrows Pe and Pm in FIG. 3) which transmits power from the engine 1 or the electric motor 13 to the driving wheels 51 and 52. The power transmitting apparatus 10 includes a plurality of rotating members 17 and 18 (not shown in detail) such as gears in the power transmitting path.

Of the plurality of rotating members 17 and 18, one rotating member 17 is integrally attached to the rotation outputting member of the electric motor 13, for example. Also, the other rotating member 18 forms a transmitting element such as either a transmitting gear or a reduction gear that extends from the rotation outputting element in the power split device 15 to a differential mechanism that is capable of differential output to the left and right driving wheels 51 and 52, for example.

Meanwhile, the vehicle schematically shown in FIG. 3 is provided with a shift lever 61 which is shifted by a driver, a range detecting sensor 62 that detects a selected range which is determined by the shift position of the shift lever 61, and an electronic control unit (hereinafter simply referred to as "ECU") 63 that electronically controls the operation of the power transmitting apparatus 10 based on the information detected by the range detecting sensor 62. The shift lever 61 is designed to be operated to select a given range from among a plurality of running ranges (e.g., a plurality of forward ranges (such as D, L, and 2), a reverse range (such as R), a neutral range (such as N), and a parking range (such as P). Incidentally, although the specific structure of the hardware of the ECU 63 is not shown, the ECU 63 includes, for example, a CPU (Central Processing Unit), ROM (Read Only Memory), RAM (Random Access Memory), and backup memory, as well as an input interface circuit that includes an A/D converter and the like, an output interface circuit that includes a relay circuit and the like, and a communication interface for communicating with other ECUs.

The power transmitting apparatus 10 also includes a shift-by-wire parking lock mechanism 20 which is controlled by the ECU 63 to operate according to the range position selected by the shift lever 61.

This parking lock mechanism 20 mechanically locks one of the rotating elements 17 or 18 (for example, the rotating element 17) in the power transmitting path when the parking range (P) is selected by a shift operation of the shift lever 61.

More specifically, as shown in FIG. 4, the parking lock mechanism 20 includes i) an SBW motor 21 which is an actuator mounted to the outside of the transmission case 11, ii) an operating link 22 that is operated (i.e., rotated) by the SBW motor 21 via a shaft 22a that is spline-engaged with the SBW motor 21, iii) a translation cam 24 that is connected to the operating link 22 and movably supported in generally the axial direction by a guide portion 23 inside the transmission case 11, and iv) a lock pawl member 26 which is engaged with a truncated cone-shaped cam portion 24a of the translation cam 24 and engages/disengages to/from either the rotating member 17 or 18, or a lock gear 25 that is integrally connected to either the rotating member 17 or 18, by the translation cam 24 moving in the axial direction. When the parking range (P) is selected according to a shift operation of the shift lever 61, the operating link 22 that is rotated by the SBW motor 21 rotates clockwise in FIG. 4 such that the translation cam 24 moves to the right in the drawing. As a result, the lock pawl member 26 that is engaged with the truncated cone-shaped cam portion 24a of the translation cam 24 engages with the lock gear 25, thus locking the lock gear 25 against rotation. Also, when a range other than the parking range (P) is selected by a shift operation of the shift lever 61, the operating link 22 is rotated by the SBW motor 21 counterclockwise in FIG. 4 from when it is locked, such that the translation cam 24 moves to the left in the drawing. As a result, the lock pawl member 26 that engages with the truncated cone-shaped cam portion 24a of the translation cam 24 disengages from the lock gear 25, thus enabling the lock gear 25 to rotate.

Incidentally, the structure itself of the parking lock mechanism 20 is well-known. Also, the power transmitting apparatus 10 may also be a well-known multi-speed automatic transmission. In this case, the operating link 22 also serves to operate a manual valve in the shift-by-wire system by driving an operating rod on the manual valve side using the concavo-convex portion on the upper portion of the operating link 22 shown in FIG. 4.

As shown in FIGS. 1 and 2, the SBW motor 21 which is an actuator for performing by-wire control includes i) a stator 31 and a rotor 32 (the conversion mechanism, the internal object) which convert electric energy, i.e., the input energy, to rotary motion, i.e., mechanical motion, and ii) a motor case 33 (the case) that houses the stator 31 and the rotor 32.

More specifically, this SBW motor 21 is a switched reluctance motor, for example.

The motor case 33 includes a cylindrical case main body 35, one end of which is closed, to which a cover fastening portion 34 formed of a metal bolt, for example, is attached, and a cover member 37 to which a metal fastening part 36 formed of an insert nut, for example, is integrally attached. The stator 31 is inserted into both the case main body 35 and the cover member 37.

Also, the cover member 37 is formed of a metal cover portion 38 and a resin cover portion 39 which are integrally formed together. As shown in FIG. 2, the metal cover portion 38 has a center portion 38a that covers one end portion side of the stator 31 and the rotor 32, and a plurality of extended portions 38b that extend from the center portion 38a to the area near the metal fastening part 36 so as to oppose the cover fastening portion 34. Incidentally, FIG. 2 shows the peripheral wall portion of the metal cover portion 38 cut parallel with the center portion 38a, with the resin cover portion 39 removed. The peripheral portions of the plurality of extended portions 38b are also marked with hatching to clearly show the area of those extended portions 38b.

Here, as shown in FIG. 1, the center portion 38a of the metal cover portion 38 is formed generally disc-shaped (e.g., a shallow cylinder, one end of which is closed, with a short axial length) covering the other end portion side of the rotor 32 and stator 31, i.e., the side opposite the side where rotation of the rotor 32 is output. The extended portions 38b of the metal cover portion 38 extend radially outward in a plurality of places (such as three places) from the outer peripheral portion of the center portion 38a. Also, an annular surrounding portion 38c that surrounds the outer periphery of the metal fastening part 36 is provided on each extended portion 38b of the metal cover portion 38. The surrounding portion 38c is close to or connected to the metal fastening part 36.

The resin cover portion 39 of the cover member 37 is formed of high hardness resin that is easy to mold. This resin cover portion 39 covers the outer surface of the metal cover 38 and forms the outer surface of the cover member 37. More specifically, the metal cover portion 38 that has been press-formed beforehand in the shape shown in FIG. 2 is embedded in the resin that forms the resin cover portion 39 by insert-forming, and is integrally retained by the resin cover portion 39. Also, as shown in FIG. 2, the resin cover portion 39 is formed with an integral connector case 39h for connecting electrical wires, which enables communication with a control circuit board via electrical wires and a contact member for connecting electrical equipment, not shown, housed in the contact case 39h.

Further, in this example embodiment (in the example shown), the surface of the outer peripheral portion of the metal fastening part 36 is machined to be concavo-convex, e.g., is knurled in a crisscross pattern, to so that it coheres with the resin cover portion 39. As a result, a relatively strong annular portion of rigid resin that is integrated with the metal fastening part 36 is formed on the surrounding portion 38c so even if the surrounding portion 38c is not directly joined to the metal fastening part 36, sufficient joining strength able to withstand a certain degree of intentionally inflicted damage is able to be maintained between the surrounding portion 38c and the metal fastening part 36. This accordingly makes it easier to center the rotor 32 and position the metal fastening part 36 in the cover member 37.

Also, the metal fastening part 36, i.e., the insert nut, is one screw member that is embedded in the resin cover portion 39 of the cover member 37, and the metal cover fastening portion 34, i.e., the bolt that is provided on the motor case 33 side, is the other screw member that screws into the metal fastening part 36 from a mounting surface 41m (see FIG. 1) toward the outside of the SBW motor 21. Incidentally, the male and female parts of the metal fastening part 36 and the cover fastening portion 34 may also be reversed. For example, the metal fastening part 36 may be formed of a bolt that is fixed to or inserted into the extended portions 38b of the metal cover portion 38 and embedded in the resin cover portion 39, and the cover fastening portion 34 may be formed of a nut that screws onto the metal fastening part 36, i.e., that bolt, on the mounting surface 41m side toward the outside of the SBW motor 21.

As shown in FIGS. 1 and 2, the case main body 35 has a metal bracket portion 41 that forms the mounting surface 41m toward the outside, a metal case portion, not shown, that covers the output side of the SBW motor 21, i.e., one end side of the stator 31 and rotor 32, and a resin case portion 43 that covers the metal case portion between the metal bracket portion 41 and the metal case portion. Here, the metal bracket portion 41 is fastened to the transmission case 11 by a special antitheft bolt, not shown.

Incidentally, the rotor 32 of the SBW motor 21 is connected either directly or indirectly via an internal reduction mechanism, not shown, to the shaft 22a that supports the operating link 22 of the parking lock mechanism 20. Also, the rotor 32 that is fixed to a shaft 32e of the SBW motor 21 is rotatably supported by the motor case 33 via a bearing 45 on the cover member 37 side that is inserted into the center portion of the metal cover portion 38, and a bearing 46 that is inserted (into the metal case portion) on the case main body 35 side.

Next the operation will be described. In the power transmitting apparatus 10 of the example embodiment structured as described above, the power transmitting paths Pe and Pm are formed which transmit power from the engine 1 or the electric motor 13 to the driving wheels 51 and 52. When shift lever 61 is shifted to select the parking range (P), a rotating element in either the power transmitting path Pe or Pm, for example, the rotating member 17 that is integrated with the lock gear 25 as the rotation outputting element of the electric motor 13, is mechanically locked by the parking lock mechanism 20.

In this state, rotation of each portion of the power transmitting mechanism from the rotating member 17 in the power transmitting path Pm to the driving wheels 51 and 52 that are drivingly connected by drive gears, chains, and shafts and the like, is restricted, thus preventing the vehicle from moving which effectively discourages theft of the vehicle.

Meanwhile, in this state, even if in the remote chance that the fastening portion of the SBW motor 21 is intentionally damaged in an attempt to unlock the parking lock mechanism 20 by rotating the rotor 32 of the SBW motor 21, the fastening portion of the cover member 37 that forms part of the motor case 33 of the SBW motor 21 has the extended portions 38b of the metal cover portion 38 so the cover member 37 is able to sufficiently withstand intentional damage for at least a certain period of time. Accordingly, the cover member 37 is able to be kept sufficiently fastened to the case main body 35 side for at least a certain period of time to effectively prevent theft. As a result, theft by breaking the fastening portion of the SBW motor 21 and unlocking the parking lock mechanism 20 to move the vehicle is able to be effectively prevented.

Moreover, because the metal cover portion 38 of the SBW motor 21 not only covers the end portion of the rotor 32 and stator 31 which form the mechanism for converting electrical energy to mechanical output, but can also be used to support them, and because there is often already an existing metal cover portion without the extended portions 38b, a cover structure can be realized which has a strong fastening structure without increasing the weight of the cover member 37 much.

Furthermore, the area around the metal fastening part 36 which is surrounded by the surrounding portion 38c of the metal cover portion 38 is reliably protected by the metal cover portion 38 and is securely joined to the metal cover portion 38, which increases the strength of the fastening portion of the SBW motor 21.

Moreover, in this example embodiment, the metal cover portion 38 is covered by the resin cover portion 39 so even if metal that can easily be molded at low cost or metal that is advantageous in view of the characteristics of the stator 31 and the rotor 32 is used for the metal cover portion 38, a corrosion resistant (e.g., rust resistant) coating and the like can be omitted and the SBW motor 21 is easier to handle.

Also, the metal cover fastening portion 34 on the motor case 33 side is screwed to the metal fastening part 36 in the cover member 37 from the mounting surface 41m side toward the outside of the SBW motor 21 such that the bolt head portion 34h of the cover fastening portion 34 is on the inside. Therefore, it is visibly clearly difficult to remove the cover member 37 from the outside, which helps to discourage theft.

Accordingly, with the power transmitting apparatus 10 of this example embodiment, the extended portions 38b of the metal cover portion enable the fastening portion of the cover member 37 which forms part of the motor case 33 of the SBW motor 21 to withstand intentional damage. As a result, theft by breaking the fastening portion of the cover member 21 to unlock the parking lock mechanism 20 can be discouraged or prevented.

Moreover, in this example embodiment, the metal cover portion 38 and the resin cover portion 39 are integrally formed together by insert-forming or the like. This makes it easier to handle the cover member 37, as well as makes it more difficult to intentionally break the cover member 37 from the outside. Also, the metal cover portion 38 is a member that rotatably supports, via the bearing 45, one end portion of the rotor 32 which is the internal object housed inside the SBW motor 21. As a result, the extended portions 38b can be easily formed by extending portions of an existing metal cover part.

In this way, according to this example embodiment, the fastening portion of the cover member 37 that forms part of the motor case 33 of the SBW motor 21 is formed by the extended portions 38b of the metal cover portion 38. As a result, the SBW motor 21 can be provided which has a cover structure that can withstand intentionally inflicted damage, and a power transmitting apparatus can be provided which can discourage theft by breaking the fastening portion of the cover member 37 to unlock the parking lock mechanism 20 of the vehicle.

Incidentally, in the example embodiment described above, the extended portions 38b are integrated with the metal cover portion 38 and extend radially outward from the generally disc-shaped metal cover portion 38 so they can easily be integrally formed by press-forming, and insert-formed on the fastening portion of the SBW motor 21. Alternatively, however, the metal cover portion 38 and the extended portions 38b do not have to be integrally formed from the same material. Instead, strong parts such as separate metal parts may be fixed or connected. Also, these extended portions 38b may be formed in a plurality of appropriate shapes and arranged at equidistant intervals in the circumferential direction, or, instead of being arranged at equidistant intervals in the circumferential direction, they may protrude radially outward from the center portion 38a of the metal cover portion 38 and be connected in the circumferential direction. Also, in this example embodiment, the SBW motor is a motor with integrated reduction gears. Alternatively, however, a reduction mechanism may be provided separately and the motor is not limited to a switched reluctance motor.

As described above, in the invention, the fastening portion of the cover member that forms part of the actuator case is formed by extended portions of the metal cover portion. As a result, an actuator can be provided which has a cover structure that can withstand intentionally inflicted damage. Moreover, a power transmitting apparatus can be provided which discourages theft by breaking the fastening portion of the cover member to unlock the parking lock mechanism of the vehicle. The invention is useful for actuators in which the actuator case has a metal cover fastening portion and a cover member to which a metal fastening part that fastens to that cover fastening portion is integrally attached, as well as all types of vehicular power transmitting apparatuses provided with such an actuator.

The invention claimed is:

1. An actuator cover structure, comprising:
 a conversion mechanism that converts input energy to mechanical motion; and
 a case that houses the conversion mechanism, and that has a metal cover fastening portion and a cover member to which an insert nut that is fastened to the cover fastening portion is integrally attached, wherein
 the cover member is formed by a metal cover portion and a resin cover portion; and
 the metal cover portion has a continuously flat disc-shaped center portion that covers part of the conversion mechanism, a cylindrical inner peripheral wall portion having a first axial length, a cylindrical outer peripheral wall portion having a second axial length that is longer than the first axial length, wherein the continuously flat disc-shaped center portion extends from a first end of the inner peripheral wall portion to a first end of the outer peripheral wall portion, and the metal cover portion further includes an extended portion that extends from a second end of the cylindrical outer peripheral wall portion and away from the center portion to the insert nut so as to oppose the cover fastening portion, and
 the insert nut is embedded in the resin cover portion of the cover member, and the metal cover fastening portion provided on the case side is formed by a bolt that screws and fastens to the insert nut from a mounting surface side toward the outside of the actuator, the bolt has a bolt head provided on the mounting surface side.

2. The actuator cover structure according to claim 1, wherein the actuator is a motor which has a rotor and a stator that convert input electrical energy into rotation output; the center portion of the metal cover portion covers an end portion of the rotor and the stator on the side opposite the side where the rotation of the rotor is output; and the extended portion of the metal cover portion extends radially outward from the second end of the outer peripheral wall portion in at least three locations.

3. The actuator cover structure according to claim 1, wherein the extended portion of the metal cover portion has a surrounding portion that surrounds an outer periphery of the insert nut.

4. The actuator cover structure according to claim 1, wherein the resin cover member covers an outer surface of the metal cover portion and forms an outer surface of the cover member.

5. The actuator cover structure according to claim 1, wherein the metal cover portion and the resin cover portion are integrally formed together.

6. The actuator cover structure according to claim 1, wherein the metal cover portion is a member that supports an internal object that is housed inside the actuator.

7. The actuator cover structure according to claim 6, wherein the internal object is the rotor of the actuator.

8. An actuator, comprising:
 a conversion mechanism that converts input energy to mechanical motion; and
 a case that houses the conversion mechanism, and that has a cylindrical case main body, one end of which is closed, to which a metal cover fastening portion is attached, and a cover member to which an insert nut that is fastened to the cover fastening portion is integrally attached, wherein
 the cover member is formed by a metal cover portion and a resin cover portion; and the metal cover portion has a continuously flat disc-shaped center portion that covers part of the conversion mechanism, a cylindrical inner peripheral wall portion having a first axial length, a cylindrical outer peripheral wall portion having a second axial length that is longer than the first axial length, wherein the continuously flat-disc shaped center portion extends from a first end of the inner peripheral wall portion to a first end of the outer peripheral wall portion, and the metal cover portion further includes an extended portion that extends from a second end of the cylindrical outer peripheral wall portion and away from the center portion to the insert nut so as to oppose the cover fastening portion, and the insert nut is embedded in the resin cover portion of the cover member, and the metal cover fastening portion provided on the case side is formed by a bolt that screws and fastens to the insert nut from a mounting surface side toward the outside of the actuator, and the bolt has a bolt head provided on the mounting surface side.

9. A shift-by-wire power transmitting apparatus which has a plurality of rotating members in a power transmitting path that transmits power from a prime mover of a vehicle to a driving wheel side, and which operates according to a shift operation, comprising:

a case to which the actuator according to claim 8 is externally mounted; and a parking lock mechanism which is operated by the actuator and mechanically locks one of the rotating members in the power transmitting path when a parking range position is selected by the shift operation.

* * * * *